United States Patent [19]
Vontz

[11] Patent Number: 5,650,572
[45] Date of Patent: Jul. 22, 1997

[54] DEVICE FOR ULTRASONIC FLOW MEASUREMENT

[75] Inventor: Thomas Vontz, München, Germany

[73] Assignee: Siemens Aktiengesellschaft, Munich, Germany

[21] Appl. No.: 635,934

[22] PCT Filed: Oct. 11, 1994

[86] PCT No.: PCT/DE94/01190
§ 371 Date: Apr. 25, 1996
§ 102(e) Date: Apr. 25, 1996

[87] PCT Pub. No.: WO95/12110
PCT Pub. Date: May 4, 1995

[30] Foreign Application Priority Data

Oct. 25, 1993 [DE] Germany ............... 43 46 370.9

[51] Int. Cl.⁶ ............................................. G01F 1/00
[52] U.S. Cl. ............................. 73/861.28; 73/861.27
[58] Field of Search .................. 73/862.27, 862.28, 73/862.29, 862.31

[56] References Cited

U.S. PATENT DOCUMENTS

| | | | |
|---|---|---|---|
| 4,103,551 | 8/1978 | Lynnworth | 73/861.27 |
| 5,090,252 | 2/1992 | Tschirner | 73/861.28 |

FOREIGN PATENT DOCUMENTS

| | | |
|---|---|---|
| 0223123 | 5/1987 | European Pat. Off. . |
| 0268314 | 5/1988 | European Pat. Off. . |
| 4010148 | 10/1991 | Germany . |

OTHER PUBLICATIONS

Bernard, "Ultraschall–Durchflußmessung", messen + prüfen/automatik, 1993, pp. 258–263.

Nückel, Flow Applications, Contrapropagating Transmission Applications, pp. 288–295.

*Primary Examiner*—George M. Dombroske
*Assistant Examiner*—Ron Biegel
*Attorney, Agent, or Firm*—Hill, Steadman & Simpson

[57] ABSTRACT

An ultrasound flow measuring tube includes an ultrasound transmitter transmitting ultrasound energy toward a reflector in the tube, which reflects the ultrasound energy so that it is reflected from a side of the tube before reaching a second reflector. The second reflector directs the ultrasound energy to an ultrasound receiver. The reflectors direct the ultrasound energy along a spiral path in the tube.

15 Claims, 11 Drawing Sheets

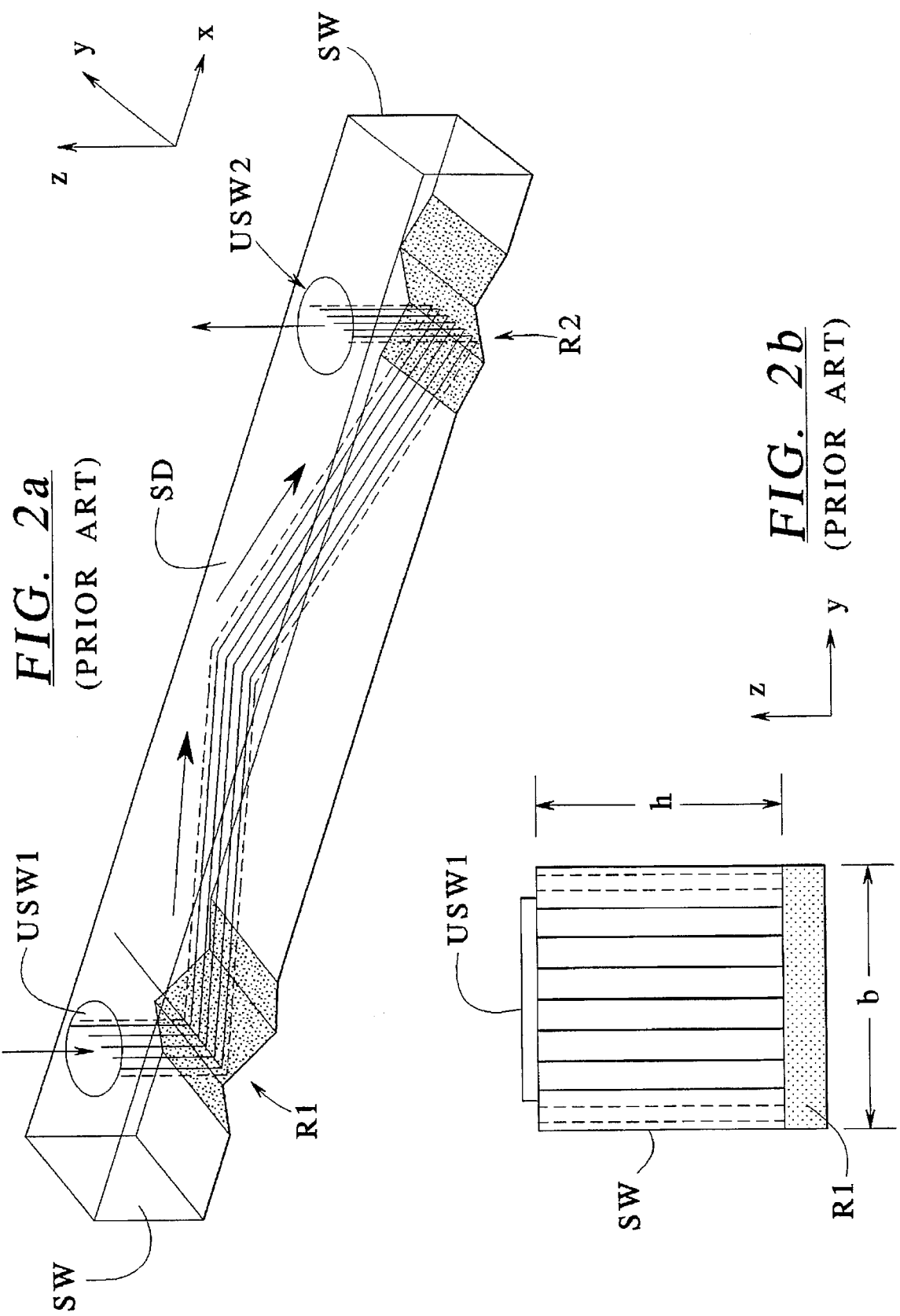

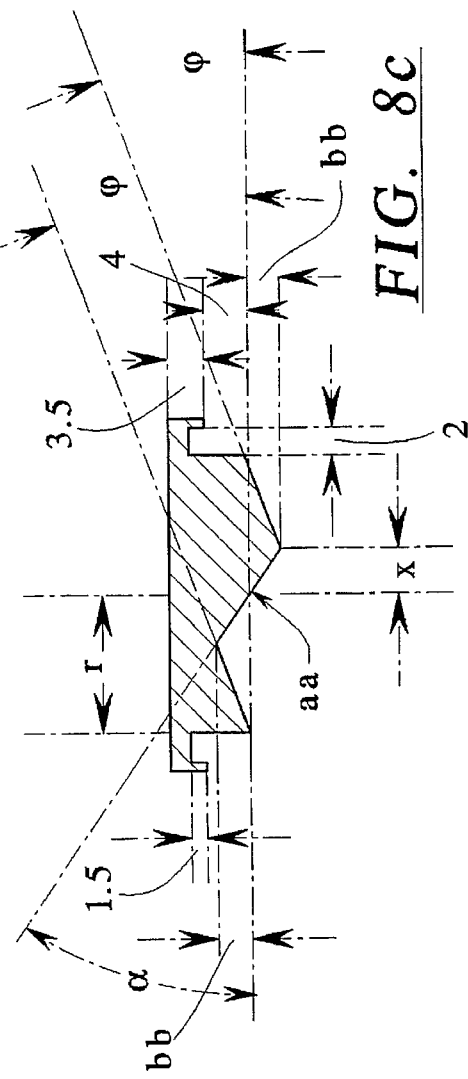
FIG. 8b
FIG. 8c
FIG. 8a
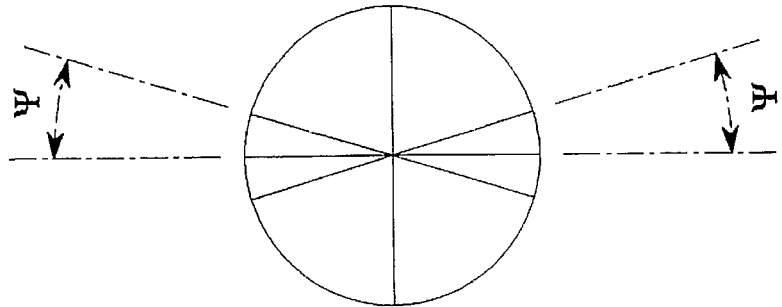
FIG. 8d
| | α[°] | φ[°] | bb[mm] | x[mm] | Ψ[°] |
|---|---|---|---|---|---|
| I) | 36.11 | 17.77 | 3.11 | 4.27 | 18.69 |

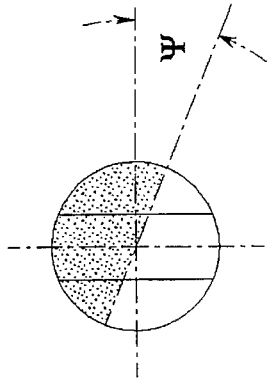
*FIG. 10c*
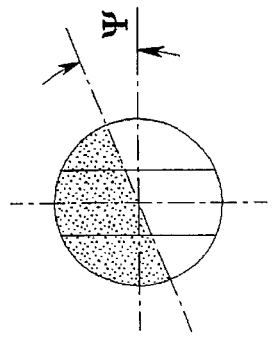
*FIG. 10d*
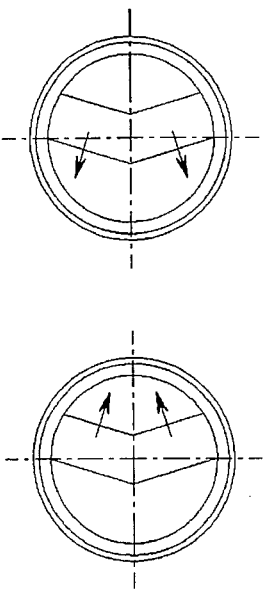
*FIG. 10a*
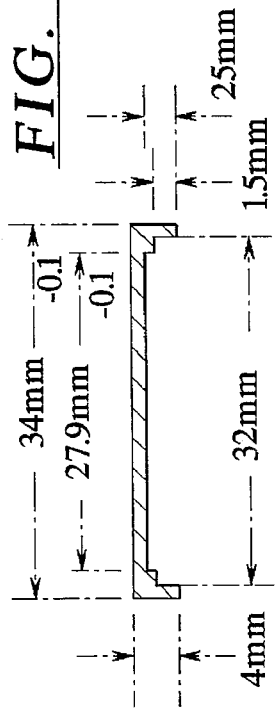
*FIG. 10e*
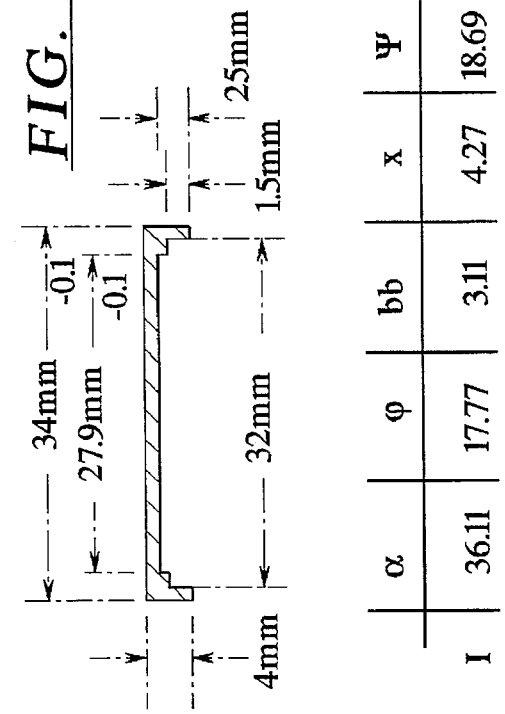
*FIG. 10f*
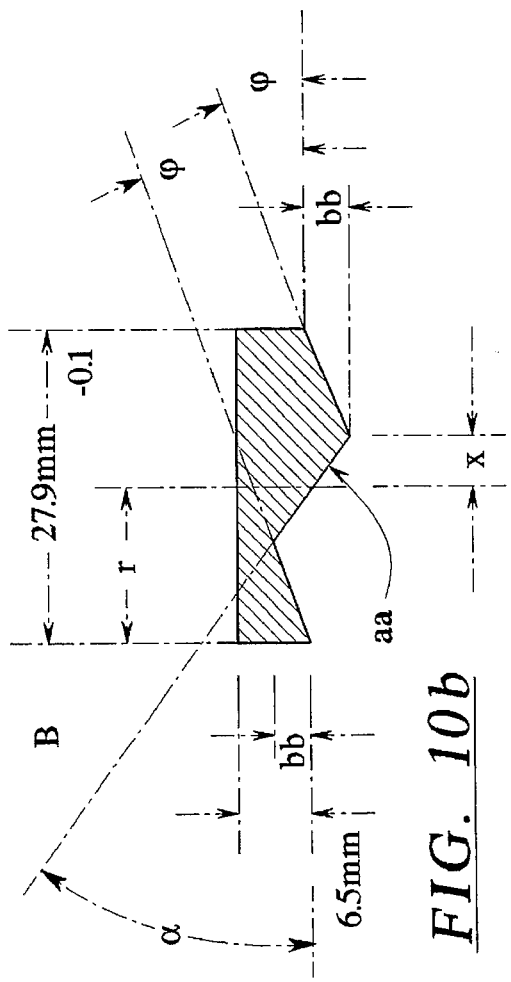
*FIG. 10b*
*FIG. 10g*
| I | α | φ | bb | x | Ψ |
|---|---|---|---|---|---|
|   | 36.11 | 17.77 | 3.11 | 4.27 | 18.69 |

FIG. 11
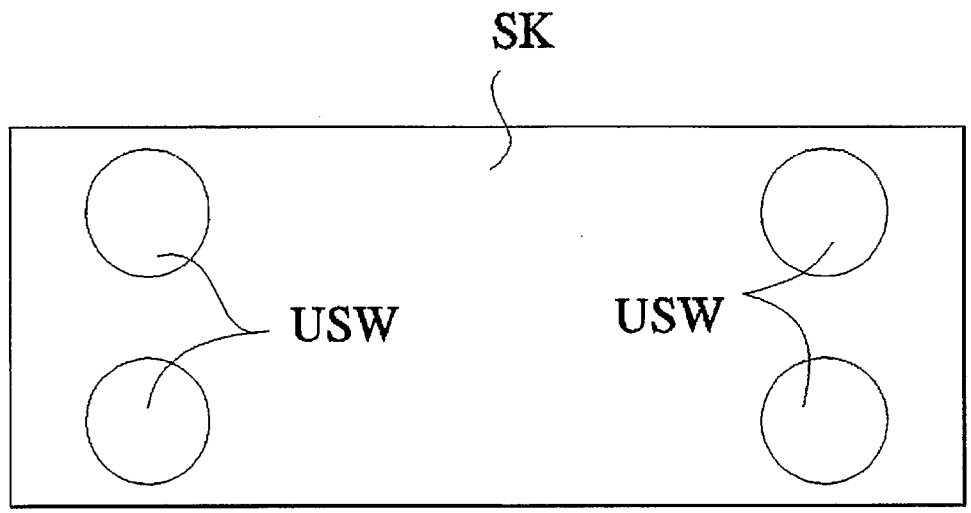
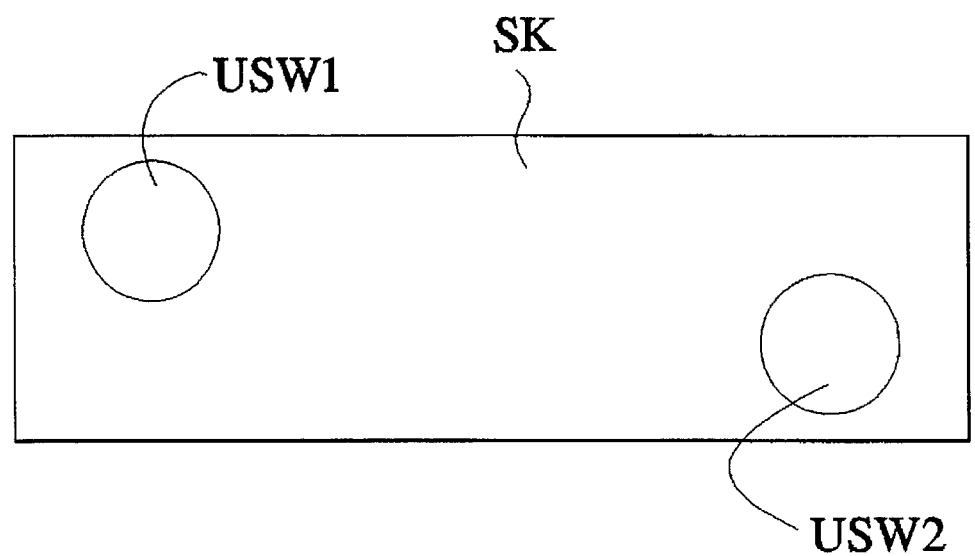
FIG. 12

DEVICE FOR ULTRASONIC FLOW MEASUREMENT

FIELD OF THE INVENTION

The present invention relates to an ultrasound flowmeter having a measurement tube through which a gaseous or liquid medium flows.

DESCRIPTION OF THE RELATED ART

When using ultrasound to measure the flow of moving liquid or gaseous media (fluids), the problem arises that the measurement signal supplied from the receiver the (ultrasound transducer) depends not only on the flow, but also on the respective flow profile in the measurement tube and on the type of fluid flowing through it. Various flow profiles result, depending on the flow rate. The laminar flow profile shown in FIG. 1a in a tube having a quadrilateral cross section occurs at a slow flow rate. The lines which are shown in the interior of the tube indicate areas of identical flow rate. Laminar flow profiles can be described by a parabolic shape, see FIG. 1c. The highest flow rates occur in the tube center. The greater the flow, the greater is the flow rate and the greater the extent to which the flow profile approximates to a box shape. FIG. 1b shows a turbulent flow profile which occurs at high flow rates. The flow rate in the nether regions of the tube remains approximately the same.

The previously known ultrasound transducers have an approximately Gaussian sensitivity distribution. The maximum sensitivity of the ultrasound transducer is at its center. It decreases sharply towards the edge. In addition, the sensitivity is sharply influenced by the tube wall characteristics when the ultrasound is injected through the tube wall.

If an ultrasound transducer is now used to ensonify the moving medium in a flow channel, as is known from German Patent Document DE 40 10 148 A1, in order to determine the flow rate from the sound propagation time or by means of the Doppler effect, then, particularly in the case of a laminar flow profile, the highest flow rate which occurs in the flow channel center is assessed more strongly than the lower flow rate which occurs at the edge of the flow channel. This has the consequence that a specific measurement characteristic is produced for each flow profile and for each fluid, which leads to a complex evaluation unit.

Furthermore, in the case of the flowmeter which is described in German Patent Document DE 40 10 148 A1, it is disadvantageous that the ultrasound signal can propagate, because of the measurement tube design, not only in a w-shape but also on a parasitic v-shaped path, and additional measures are therefore necessary to suppress the signal components resulting therefrom.

The publication "Ultraschall-Durchflußmessung" [Ultrasound flow measurement] by H. Bernard, messen+prüfen/automatik [Measurement Testing/automatic system], Issue 5, 1983, pages 258 to 263 discloses a flowmeter having a measurement tube through which a liquid medium flows and in the case of which disturbances of the flow profile are reduced in that measurement beams produced by a plurality of ultrasound transducers are distributed over the tube cross section. The complexity for signal evaluation increases with the number of ultrasound transducers used.

Pages 288 et seqq of the publication "Ultrasonic Measurements for Process Control" Academic Press, San Diego, 1989, by L. C. Linworth describe a flowmeter whose measurement tube is provided with an ultrasound transmitting transducer and an ultrasound receiving transducer. The transmitting and receiving surfaces of the ultrasound transducers are in this case inclined in such a manner that the transmitted sound is reflected, depending on the embodiment, at one, two or four reflection points in the measurement tube.

The U.S. Pat. No. 4,103,551 specifies an ultrasound measurement system for different flow characteristics. The device is used for ultrasound flow measurement in a round tube which has two ultrasound transducers which communicate with one another along an acoustic path in the tube. The acoustic path includes a chord which bisects the tube radius.

A device for determining the flow in a cylindrical tube is disclosed in European Patent Document EP 0 268 314 A1, which forms the prior art. The flow measurement device has a first and a second pair of ultrasound transducers, one of the ultrasound transducers in each case transmitting an ultrasound signal obliquely into the tube, in which the signal is reflected at two points in the measurement tube and passes in an inclined manner to the corresponding receiving transducer. This device allows disturbances resulting from vortices occurring in the flow to be compensated for.

SUMMARY OF THE INVENTION

The present invention is based on the object of providing a device which has improved measurement accuracy and whose measurement signal depends only on the flow and no longer on the type of fluid used and the flow profile which is present.

This and other objects and advantages are achieved according to the invention by a device having an ultrasound transducer which ensonifies the medium, having a first reflector which is arranged in the measurement tube and having an ultrasound receiving transducer, the individual components being oriented with respect to one another in such a manner that the ultrasound is reflected at least once on a planar wall of the measurement tube, a normal to the surface of the first reflector having three components, which are not zero, in a rectangular coordinate system, one of whose axes is oriented parallel to the flow direction.

Advantageous developments of the invention result from the flowmeter having a first reflector which is of segmented construction, the normals to the surfaces of the reflector segments not being oriented parallel to one another. Preferably, the first reflector is arranged opposite the ultrasound transducer in the measurement tube. The ultrasound transducer injects the ultrasound into the measurement tube at right angles to the flow direction in one embodiment. A second reflector may be arranged in the measurement tube.

In a proposed embodiment, a normal to the surface of the second reflector has three components in the rectangular coordinate system. In particular, a second reflector which is of segmented construction is provided, the normals to the surfaces of the reflector segments not being oriented parallel to one another. The second reflector is arranged opposite the ultrasound receiving transducer in the measurement tube.

In one development, the flowmeter has a planar first and/or second reflector. The reflector segments of the first and/or second reflector are planar surfaces. The flowmeter is characterized in that one axis of symmetry of the ultrasound transducer is oriented parallel to one axis of symmetry of the ultrasound receiving transducer. Alternately, one axis of symmetry of the ultrasound transducer is inclined with respect to one axis of symmetry of the ultrasound receiving transducer.

BRIEF DESCRIPTION OF THE DRAWINGS

The invention is explained in more detail with reference to the figures.

FIG. 2a, 2b, 2c, and 2d show a conventional ultrasound flowmeter in which the flow channel is ensonified parallel to the side walls in perspective view, end view, plan view and side elevation.

FIGS. 8a, 8b, 8c, and 8d show a reflector of the ultrasound flowmeter according to FIGS. 4a–4d in schematic diagram, plan view, cross second and dimension table.

FIGS. 10a, 10b, 10c, 10d, 10e, 10f, and 10g show a reflector of the ultrasound flowmeter according to FIGS. 6a–6d in cross sections, diagnostic views, plan views and dimension table.

FIGS. 11 and 12 show further exemplary embodiments of ultrasound flowmeters according to the invention having a plurality of ultrasound transmitting and receiving transducers or with axially offset ultrasound transmitting/receiving transducers in plan views.

DETAILED DESCRIPTION OF THE PREFERRED EMBODIMENTS

Figure 1A:
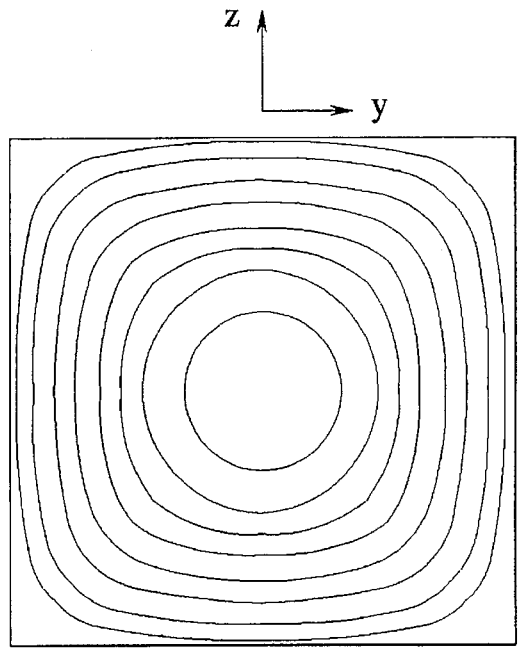
FIGS. 1a, 1b, and 1c show a laminar flow profile and a turbulent flow profile in the flow channel cross section, and possible flow profiles in the flow channel, in a side view.
Figure 1A:
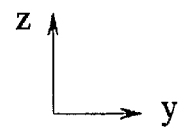
Figure 1B:
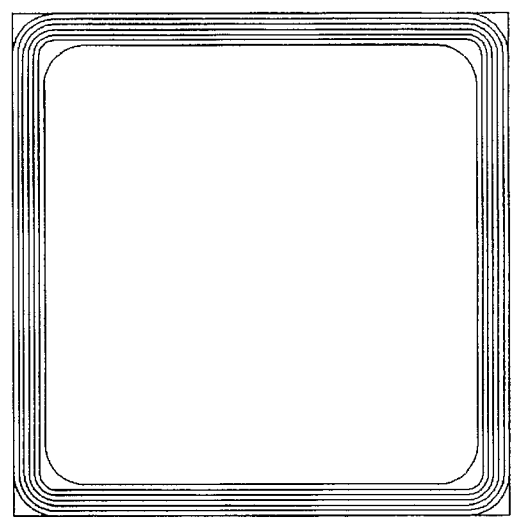
Figure 1C:
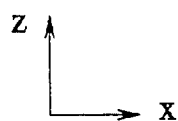
Figure 1C:
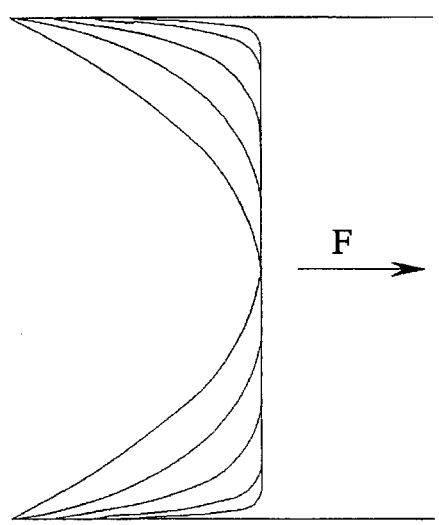
Figure 2C:
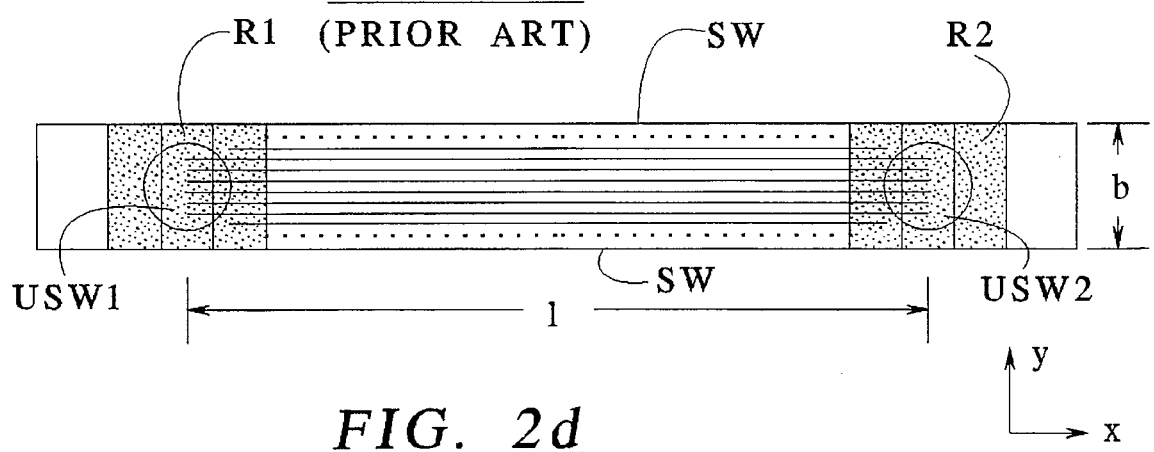
Figure 2D:
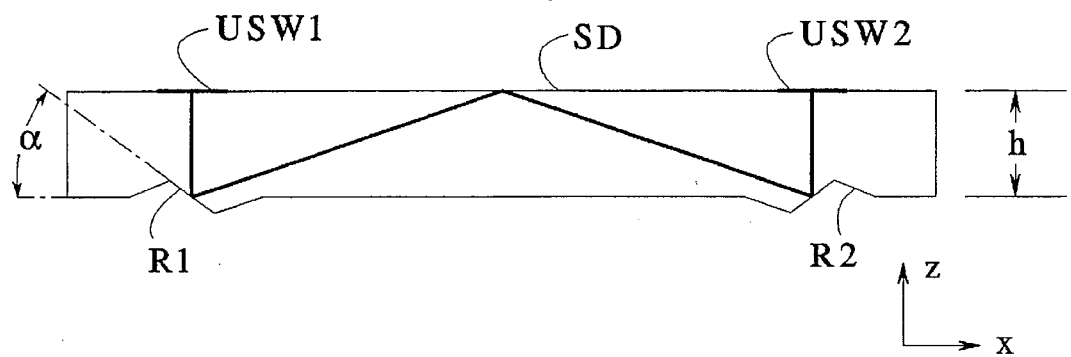
Figure 3:
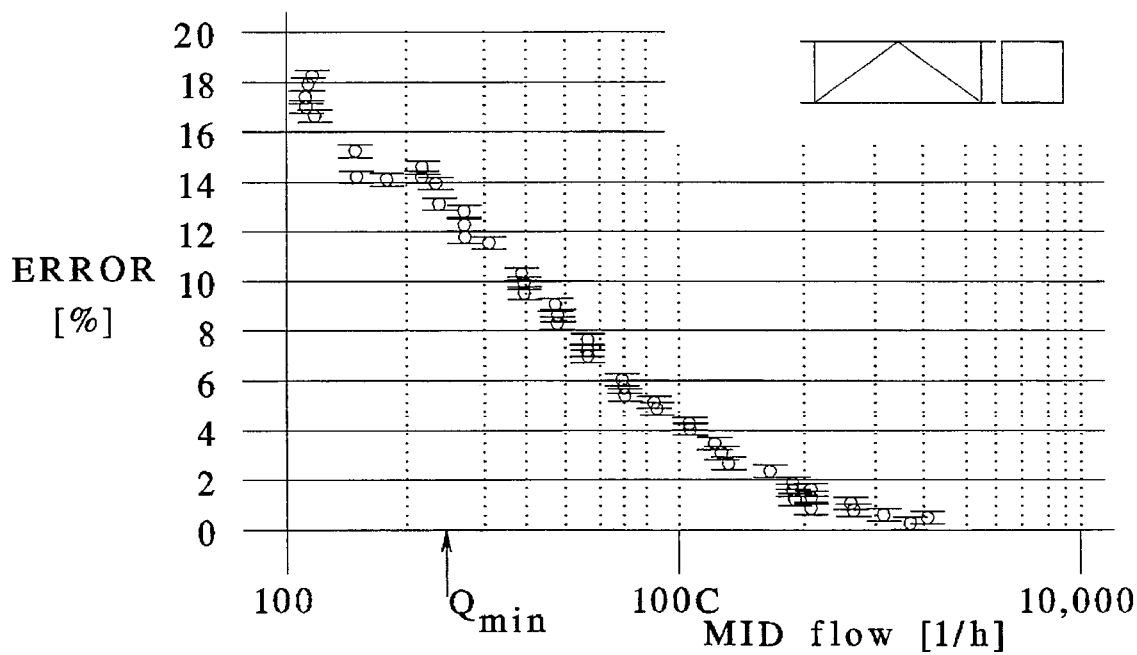
FIG. 3 shows a graph the error curve for the ultrasound flowmeter according to FIGS. 2a–2d.

In measurement arrangements for flow channels having diameters $d \leq 50$ mm, the sound is normally guided parallel to the flow channel side walls SW from an ultrasound transducer USW1 which acts as a transmitter to an ultrasound receiving transducer USW2 (see FIGS. 2a–2d). In the case of the illustrated flowmeter, the sound passes through the flow channel on a V-shaped path, the reflector R1 which is opposite the transmitter USW1 deflecting the ultrasound in the direction of the flow channel cover SD, and the second reflector R2 deflecting the ultrasound in the direction of the receiving transducer USW2. The directional characteristics of the ultrasound transducers used produce increased sensitivity of the connecting lines between the transducer centers. In this case, a Gaussian distribution of the sensitivity from the transducer center towards the edge can be assumed. This is shown in FIG. 2a–2c by grey coding of a detail in the form of a line from the transducer USW1 (black:=greatest, light-grey:=least sensitivity). If the ultrasound propagates only parallel to the side walls SW, the beams (the propagation direction of a wave front is illustrated in simplified form in the following text by the propagation direction of beams) run with the greatest sensitivity through the central region of the flow channel and, in consequence, also record the higher rates with a greater weighting. In contrast, less sensitive beams pass through the edge regions of the flow channel, so that the low rates which occur there are recorded with a correspondingly lower weighting. This results in error curves having a very large error at low rates (=little flow), which error decreases slowly for higher rates (=large flow). In the error curve shown in FIG. 3, the relative measurement errors of the ultrasound measurement are illustrated in comparison with a reference method, for example measurement using a magneto-inductive flowmeter (MID).

In order to ensure largely homogeneous ensonification, that is to say uniform sensitivity over the channel cross section, sound waves of high sensitivity, that is to say the ultrasound waves originating from the center of the transducer USW1, are passed with the aid of suitably oriented reflectors R1/R2 through all the regions of the flow channel (see FIGS. 4a–4d and 6a–6d). This is achieved by the combined and alternate use of reflection of the sound waves on the side walls SW, on the top surface SD and on the base SB of the flow channel. Instead of transmitting the ultrasound exclusively parallel to the side walls SW from a first ultrasound transducer to a second ultrasound transducer, that is to say using only the top-surface and bottom reflection, the ultrasound passes through the flow channel in a helical shape in the flowmeter according to the invention. The homogenization of the ensonification of the flow channel achieved in this way, with beams of widely different sensitivity, becomes particularly clear by comparing FIGS. 4b and 6b with FIG. 2b.

The exemplary embodiments which are described in the following text relate to a flow channel of length 1 (1:= distance between the transducer center) having a rectangular cross section (width b, height h).

In order to define the geometry of the flow channel and the orientation of the reflectors R1 and R2, the reflection angles have to be calculated. A new angle $\Psi$ for the reflection on the side walls (see FIG. 4c) is used in additioin to the conventional angle $\alpha$ for the top-surface and bottom reflection which gives the classical V-path for the sound propagation in the exemplary embodiment shown.

According to the invention, the two angles $\alpha$ and $\Psi$ are calculated and combined taking account of the following boundary conditions:

1) The path lengths of the individual beams are intended to be of equal length in order that beam elements are not accidentally obliterated by interference. The shape of the wave front thus remains preserved.

2) There are only two possible sound paths for the angle $\alpha$ (bottom/top-surface reflection) in the case of the arrangement of transducers and reflectors chosen in the exemplary embodiments: the V-shaped sound path and the W-shaped sound path (the forward and return propagation paths at right angles to the flow direction F do not contribute to the measurement signal and are thus not considered).

Figures 4A, 4B:
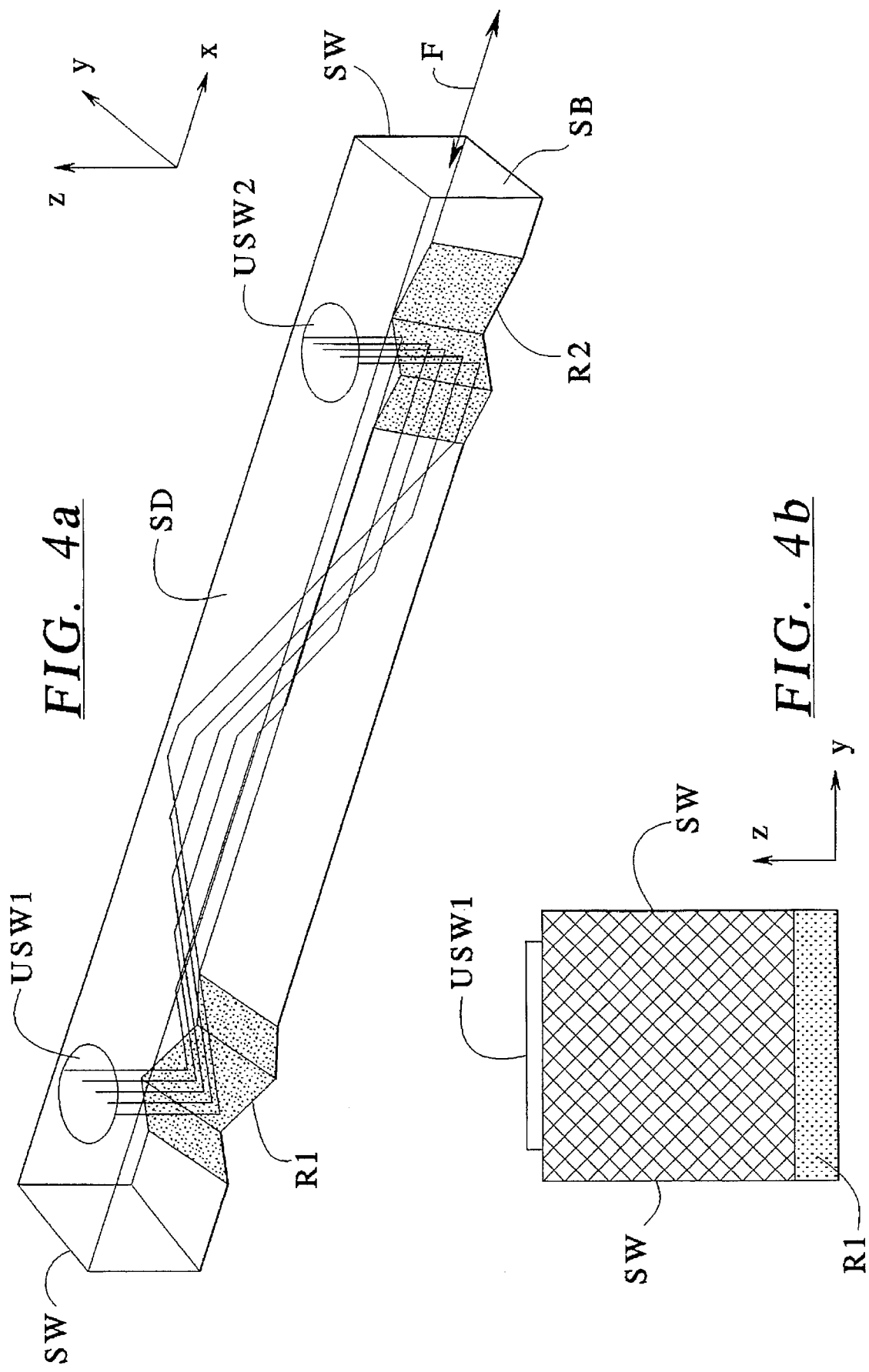
FIGS. 4a, 4b, 4c, and 4d flowmeter according to the invention in which the flow channel is ensonified in a helical shape in perspective view, end view, plan view and side elevation.
Figure 4C:
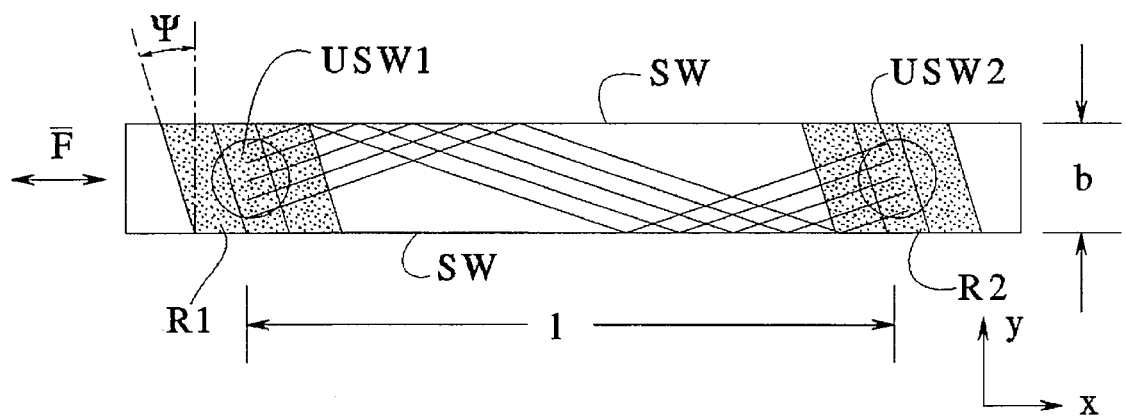
Figure 4D:
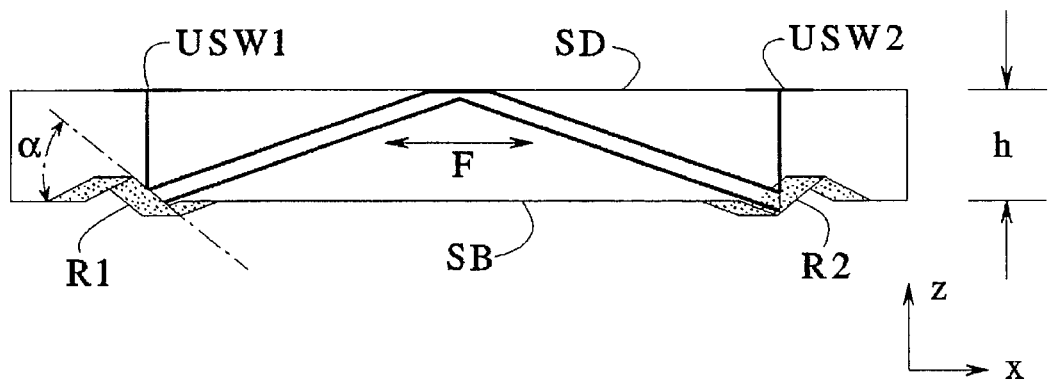

The V-shaped sound path is characterized in that the sound passes from the transducer USW1 via the reflector R1 to the flow channel top surface SD, is reflected from there in the direction R2 and is deflected from the reflector R2 to the ultrasound transducer USW2 (top-surface reflection, see FIG. 4d).

In the case of the W-shaped sound path, which is not illustrated, the ultrasound transmitted from a transmitting transducer passes via the stations–first reflector–flow channel top surface–flow channel bottom flow channel top surface–second reflector–to the receiving transducer (three reflections on the walls of the flow channel).

Without transverse sound ($\Psi=0$), the elevation angles $\alpha_V$ for the V-shaped sound path and $\alpha_W$ for the W-shaped sound path are calculated from:

$$\alpha_V = 0.5 \cdot l \cdot \arctan(0.5 \cdot l/h)$$

Figure 5:
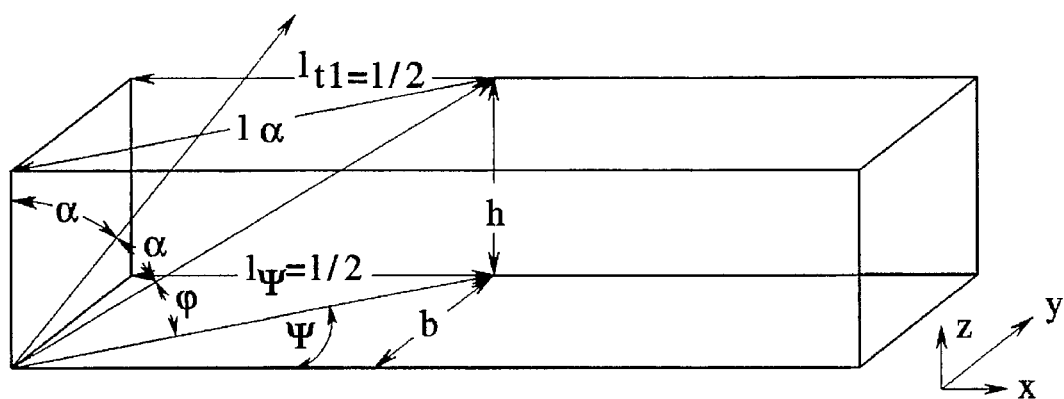
FIG. 5 shows an orthogonal view of the relative dimensions of the flow channel for determination of the reflection angles.
Figure 6A:
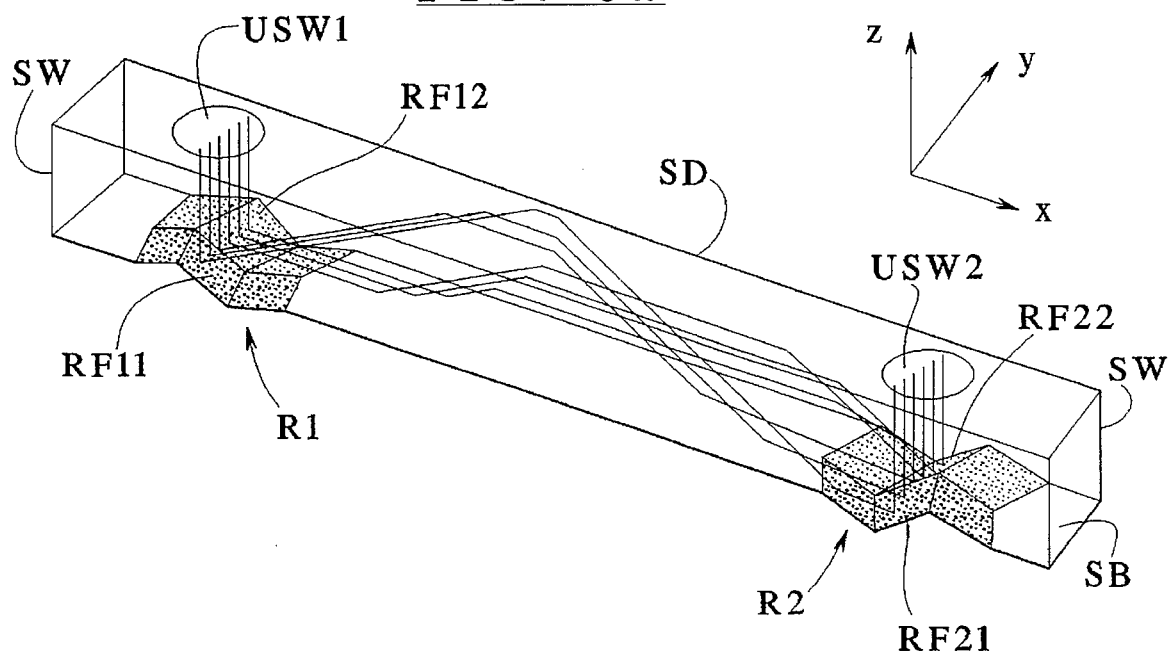
FIGS. 6a, 6b, 6c, and 6d show a exemplary embodiment of an ultrasound flowmeter according to the invention in perspective view, end view, plan view and side elevation.
Figure 6B:
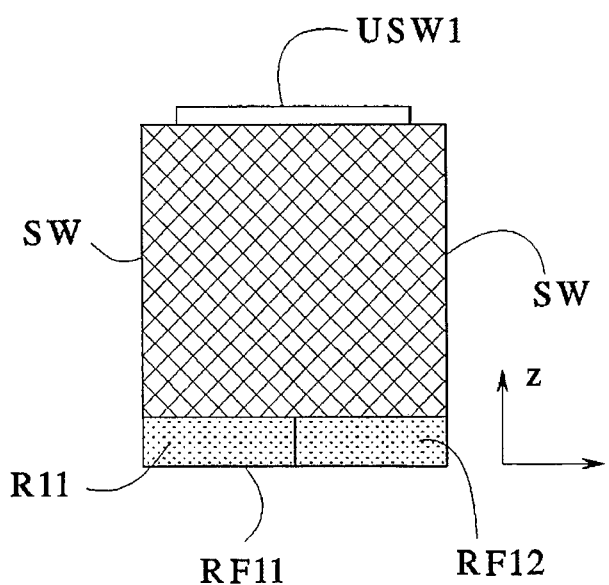
Figure 6C:
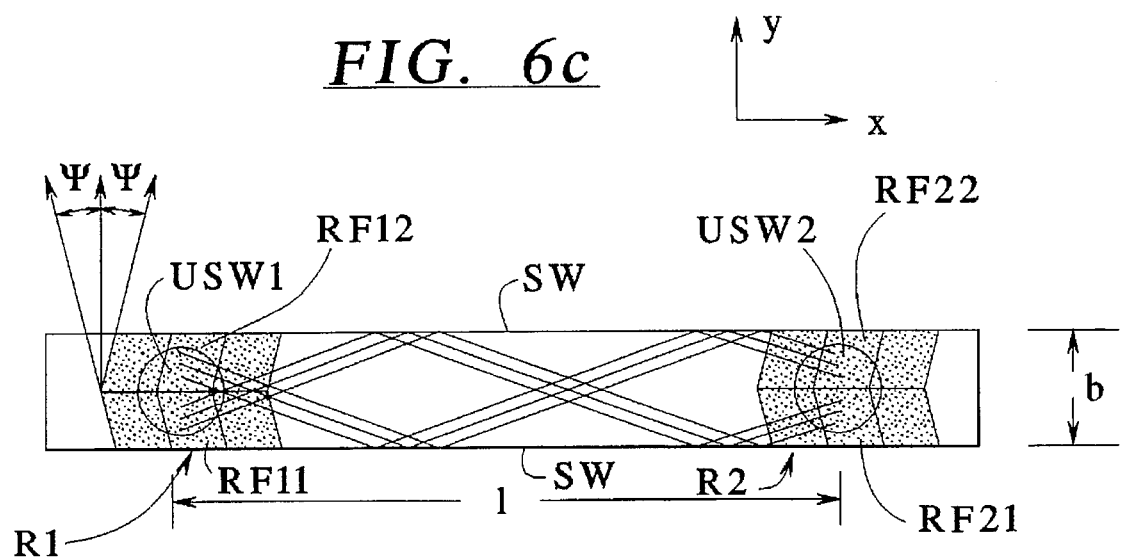
Figure 6D:
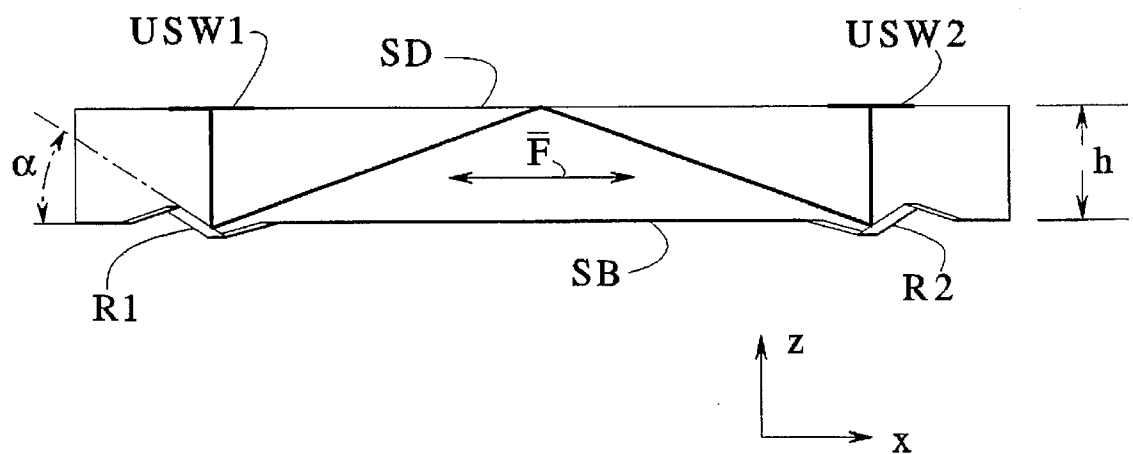

$\alpha_w=0.5 \cdot l \cdot \arctan(0.25 \cdot l/h)$ $\alpha_v$=elevation angle for a v-shaped sound path $\alpha_w$=elevation angle for a w-shaped sound path With transverse sound (azimuth angle $\Psi \neq 0$), the two elevation angles $\alpha_V$ and $\alpha_W$ become:

$\alpha_v=0.5 \cdot l \cdot \arctan(|0.5 \cdot 1/\cos(\Psi)|)=0.5 \cdot l$ $\arctan(l_{\alpha v}/h)$ $\alpha_w=0.5 \cdot l \cdot \arctan(|0.25 \cdot 1/\cos(\Psi)|)=0.5 \cdot l$ $\arctan(l_{\alpha w}/h)$ A range of values is possible for the azimuth angle $\Psi$ (transverse sound: reflection on the side walls SW) by reflector segmentation and orientation. However, only a few are suitable to ensure the homogeneous distribution of the sensitivity. From the distance l$\Psi$ between the first reflector R1 and the reflection point on the side wall SW and the flow channel width b, the azimuth angle $\Psi$ can be determined as follows:

$\Psi=\pm\arctan(b/l_\Psi)$ (see FIG. 5). The following exemplary embodiments result from this equation:

1st Exemplary Embodiment:

Both reflectors R1 and R2, and thus the reflection surfaces RF1 and RF2 as well, are rotated through the azimuth angle $\Psi$ (see FIG. 4c). The rotation direction is irrelevant since the configurations are symmetrical. The distance l$\Psi$ can be chosen from the following set:

$l\Psi=\{½ \cdot l; ¼ \cdot l; ⅙ \cdot l\}$

Higher orders are ignored here since the signal quality would otherwise suffer because of the large number of reflections.

2nd Exemplary Embodiment:

One reflector is rotated through the azimuth angle $\Psi$, and the other through the azimuth angle $-\Psi$. The distance l$\Psi$ can then be selected to be:

$l\Psi=\{⅕ \cdot l\}$

3rd Exemplary Embodiment:

The reflectors are divided into two reflection surfaces in each case. Each of these reflection surfaces is given its own alignment $+\Psi$ or $-\Psi$, respectively (see FIG. 6c). The reflection surface RF11 of the first R1 is rotated through the angle $-\Psi$, and the reflection surface RF12 of the reflector R1 is rotated through the angle $+\Psi$. The reflection surfaces RF21 and RF22 of the second reflector R2 are rotated in the same manner. The azimuth angle $\Psi$ is determined from the above equation in the same way as for the exemplary embodiments 1 and 2. As a result of such a combination of the reflectors, the incident wave front is split into two wave fronts which continue in different directions and recombine in the second reflector R2 after passing through a path of equal length. The distance l$\Psi$ can be chosen from the set:

$l\Psi=\{l; ½ \cdot l; ⅓ \cdot l; ¼ \cdot l; ⅕l$ etc$\}$

4th Exemplary Embodiment:

The azimuth angle $\Psi$ is selected such that the first reflector R1 and the second reflector R2 produce a convex combination, that is to say the first reflection surface RF11 of the first reflector R1 is rotated through the azimuth angle $-\Psi$, the second reflection surface RF21 of the first reflector R1 is rotated through the azimuth angle $+\Psi$, the first reflection surface RF12 of the second reflector R2 is rotated through the azimuth angle $+\Psi$ and the second reflection surface RF22 of the second reflector R2 is rotated through the azimuth angle $-\Psi$. The recombination of the wave front in the second reflector R2 in this case takes place with redistribution of the sensitivity from the center towards the edge, and vice versa. In consequence, although the distribution is improved, signal level losses must be expected. The distance l$\Psi$ should be selected to be:

$l\Psi=⅔ \cdot l$

5th Exemplary Embodiment:

The azimuth angle $\Psi$ is selected such that the first reflector R1 and the second reflector R2 produce a concave combination, that is to say the first reflection surface RF11 of the first reflector R1 is rotated through the azimuth angle $+\Psi$, the second reflection surface RF21 of the first reflector R1 is rotated through the azimuth angle $-\Psi$, the first reflection surface RF12 of the second reflector R2 is rotated through the azimuth angle $+\Psi$, and the second reflection surface RF22 of the second reflector R2 is rotated through the azimuth angle $-\Psi$. In this case, the recombination of the wave front takes place as in the 4th exemplary embodiment. The distance l$\Psi$ is advantageously selected to be:

$l\Psi=⅔ \cdot l$

In all the quoted exemplary embodiments, the distance l$\Psi$ should not be less than the stated value range since the signal quality would otherwise suffer because of the large number of reflections.

Figure 7:
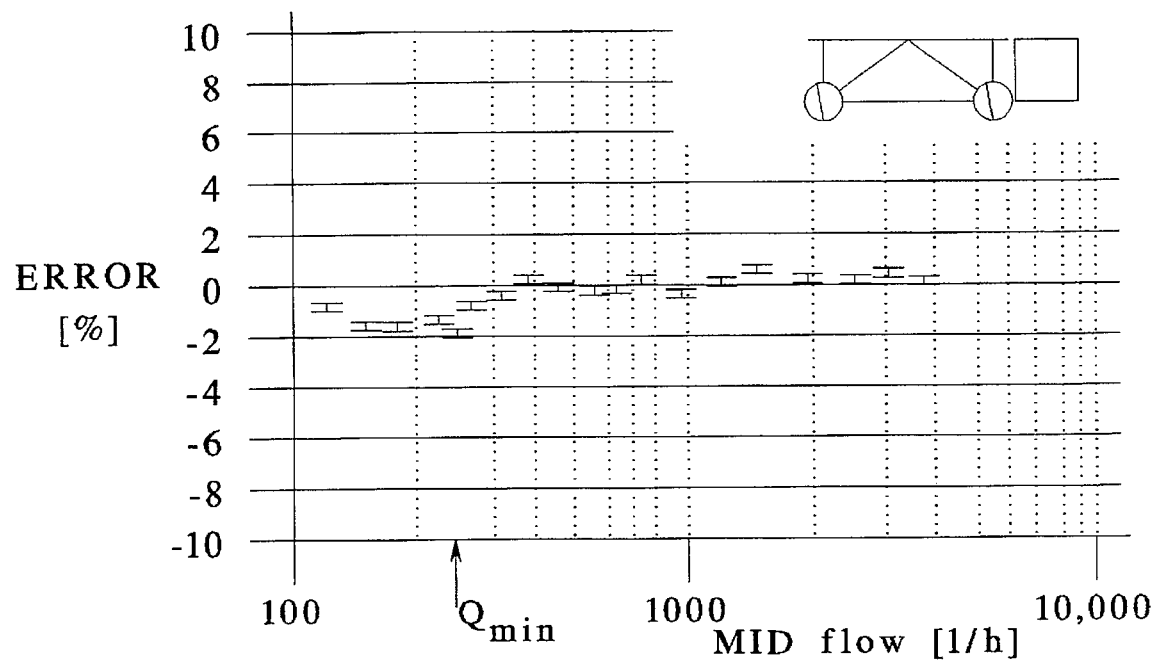
FIG. 7 shows a graph the error curve for the ultrasound flowmeter according to FIGS. 4a–4d.

The exemplary embodiment 1 which is shown in FIGS. 4a–4d and has a V-shaped sound path gave the best results in trials with respect to the linearity and the material independence of the characteristics (see FIG. 7 in this context). The error for the test medium of glycol was less than ±1.5% in the tested measurement range from 100 to 4000 l/h. In the case of the ultrasound flowmeter which is illustrated in FIGS. 2a–2d and in which the ensonification is parallel to the side walls, the measurement error for small flows was >18%. For water, the errors are in a band of ≤0.8% (previously 9%), in each case in comparison with an MID flowmeter for which a maximum error of 0.5% can be assumed.

The reflector which is illustrated in FIGS. 8c–8d can be used, in particular, in a flowmeter according to FIGS. 4a–4d. The reflector is preferably produced from brass and has the relative dimensions specified in the following table. This table also includes the dimensions of the flow channel.

TABLE 1

| | | |
|---|---|---|
| Length | l = | 130 mm |
| Height | h = | 22 mm |
| Width | b = | 22 mm |
| Reflector radius | r = | 14 mm |
| Reflector size | bb = | 3.11 mm |
| Reflector size | x = | 4.27 mm |
| Left rotation angle | $\psi L$ = | $-\text{ArcTan}[b/(0.5 \cdot 1)]$ |
| | = | $-18.69°$ |
| Right rotation angle | $\psi R$ = | $-18.699°$ |
| V-Path preset | $l_{t1}$ = | $0.5 \cdot 1$ |
| Rotated V-path | $l_\alpha$ = | $\text{Abs}[l_{t1}/(\text{Cos}[\psi L])]$ |
| Incidence angle between bottom and top surface | $\alpha$ = | $0.5 \cdot 1 \cdot \text{ArcTan}[l_\alpha/h]$ |
| | = | $36.11°$ |
| Incidence angle between side walls | $\phi$ = | $90 - 2\alpha = 17.77°$ |

$aa=r/(\text{Cos}[\alpha]+\text{Sin}(\alpha)/\text{Tan}[Pi/2-2\alpha])$ $x=aa\text{Cos}[\alpha]$ $bb=aa\text{Sin}[\alpha]$ X designates the horizontal projection of the inclined surface aa, and bb the height of the edges.

Figure 9:
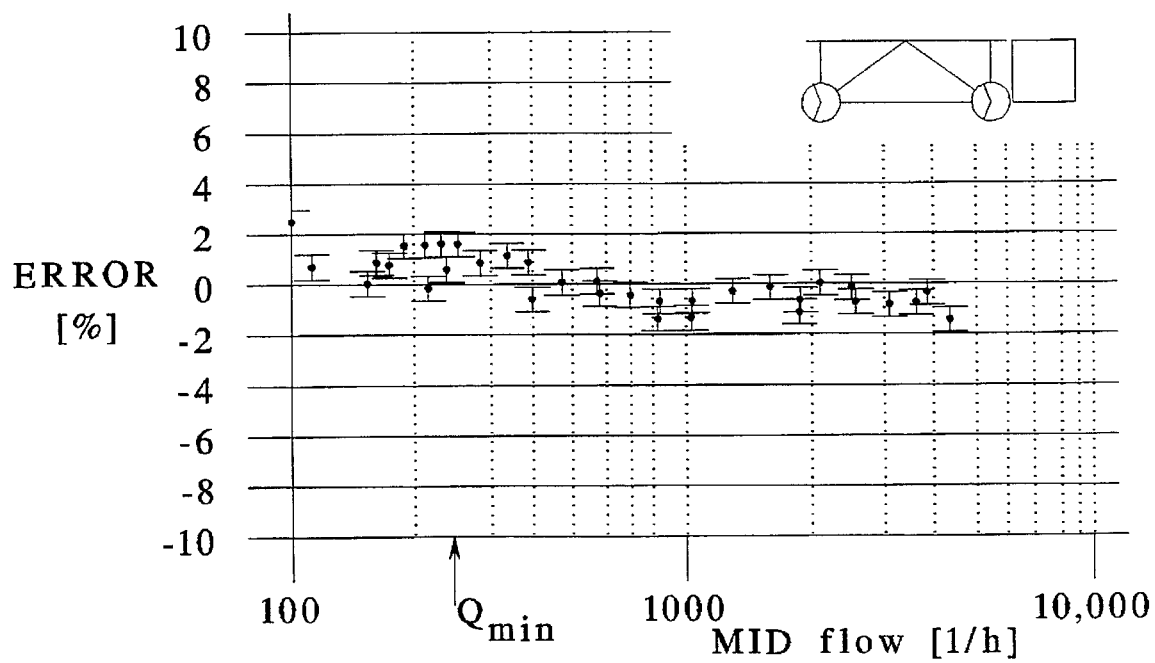
FIG. 9 shows a graph of the error curve for the ultrasound flowmeter according to FIGS. 6a–6d.

Similarly good results in terms of the linearity and the material independence of the characteristics were obtained for the exemplary embodiment 3 shown in FIGS. 6a–6d (see FIG. 9). However, the desired signal level is somewhat lower than in the case of exemplary embodiment 3. The error in the test with glycol (water) was less than ±2% (1%) in the measurement range from 100 to 4000 l/h.

The reflectors used in the flowmeter according to FIGS. 6a–6d can be produced from the components illustrated in FIGS. 10a–10g as follows:

On the one hand, the parts marked grey and, on the other hand, the white parts are cut in a matching manner as indicated in C and D from in each case one pair of the part B. A part E and part F are joined together from in each case one half from C and D (two grey parts produce one part E and two white parts produce one part F). The relative dimensions of the angles are specified in FIG. 10 and Table 2.

TABLE 2

| | | |
|---|---|---|
| Length | l = | 130 mm |
| Height | h = | 22 mm |
| Width | b = | 22 mm |
| Reflector radius | r = | 14 mm |
| Reflector size | bb = | 3.11 mm |
| Reflector size | x = | 4.27 mm |
| 1st left rotation angle | ψL = | −ArcTan[b/(0.5 · l)] = −18.69° |
| 1st right rotation angle | ψR = | −ψL = 18.699° |
| 2nd left rotation angle | ψL = | −ψL = 18.69° |
| 2nd right rotation angle | ψR = | ψL = −18.699° |
| V-path preset | $l_{t1}$ = | 0.5 · l |
| Rotated V-path | $l_\alpha$ = | Abs [$l_{t1}$/(Cos[ψL]) |
| Incidence angle between bottom and top surface | α = | 0.5 · l ArcTan[$l_\alpha$/h] = 36.11° |
| Incidence angle between side walls | φ = 90 − 2α = 17.77° | |

Further possible variations for the construction of the measurement device according to the invention are specified in the following text:

All combinations of the axial and transverse-axial reflections

Length variation

Variation of the ratio of the tube dimensions

Combination of two or more measurement tubes having a different measurement characteristic Use of a plurality of transmitters having greater nominal widths Hexagonal cross section of the tube Oval or round cross section of the tube Diameter change in the axial direction, conical tubes Reflectors on different walls Rotated, planar reflectors Reflectors which are rotated and split into a plurality of reflection surfaces Curved reflectors which are rotated and/or not rotated Transmitting and receiving transducers on one side of the flow channel Transmitting and receiving transducers on opposite sides of the flow channel Transmitting and receiving transducers that are axially offset from one another (see FIG. 12)

A plurality of transmitting and receiving transducers distributed on different side walls (see FIG. 11).

The measurement device according to the invention is suitable not only for flow measurement of widely different liquids, but also for flow measurement of widely different gases as well as for the water flowmeters, called heating meters, in heating/cooling systems.

Although other modifications and changes may be suggested by those skilled in the art, it is the intention of the inventor to embody within the patent warranted hereon all changes and modifications as reasonably and properly come within the scope of his contribution of the art.

I claim:

1. A flowmeter, comprising:

a quadratic measurement tube through which a fluid medium flows in a flow direction, an ultrasound transmitting transducer which ensonifies the fluid medium, a reflector arranged in said measurement tube to reflect ultrasound energy from said ultrasound transmitting transducer, said reflector having a normal to a surface of said reflector having three non-zero components in a rectangular coordinate system, one axis of said coordinate system being parallel to the flow direction an ultrasound receiving transducer positioned to receive the ultrasound energy reflected by said reflector said ultrasound transmitting transducer and said reflector and said ultrasound receiving transducer being oriented with respect to one another in such a manner that the ultrasound energy is reflected at least once on every planar wall of said measurement tube.

2. A flowmeter as claimed in claim 1, wherein said reflector is of segmented construction having reflector segments, normals to reflective surfaces of said reflector segments being non-parallel to one another.

3. A flowmeter as claimed in claim 1, wherein said reflector is arranged opposite said ultrasound transmitting transducer in said measurement tube.

4. A flowmeter as claimed in claim 1, wherein said ultrasound transmitting transducer is positioned to inject the ultrasound energy into said measurement tube at right angles to the flow direction.

5. A flowmeter as claimed in claim 1, wherein said reflector is a first reflector, and further comprising:

a second reflector is arranged in said measurement tube.

6. A flowmeter as claimed in claim 5, wherein said second reflector has a normal to a reflective surface having three components in the rectangular coordinate system.

7. A flowmeter as claimed in claim 5, wherein said second reflector is of segmented construction having reflector segments, normals to surfaces of said reflector segments being oriented non-parallel to one another.

8. A flowmeter as claimed in claim 5, wherein said second reflector is arranged opposite said ultrasound receiving transducer in said measurement tube.

9. A flowmeter as claimed in claim 1, wherein said reflector is planar.

10. A flowmeter as claimed in claim 2, wherein said reflector segments are planar surfaces.

11. A flowmeter as claimed in claim 1, wherein said ultrasound transmitting transducer has one axis of symmetry oriented parallel to one axis of symmetry of said ultrasound receiving transducer.

12. A flowmeter as claimed in claim 1, wherein said ultrasound transmitting transducer has one axis of symmetry inclined with respect to one axis of symmetry of said ultrasound receiving transducer.

13. A flowmeter as claimed in claim 5, wherein said second reflector is planar.

14. A flowmeter as claimed in claim 5, wherein said first and second reflectors are planar.

15. A flowmeter as claimed in claim 7, wherein said reflector segments of said second reflector are planar surfaces.

* * * * *